US006456187B2

(12) United States Patent
Konda et al.

(10) Patent No.: US 6,456,187 B2
(45) Date of Patent: Sep. 24, 2002

(54) BREAKER APPARATUS

(75) Inventors: Kazumoto Konda, Nagoya (JP); Junji Muta, Yokkaichi (JP); Tatsuya Sumitda, Yokkaichi (JP); Yoshito Oka, Yokkaichi (JP); Ichiaki Sano, Nagoya (JP)

(73) Assignees: Autonetworks Technologies, Ltd., Nagoya (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 95 days.

(21) Appl. No.: 09/731,663

(22) Filed: Dec. 8, 2000

(30) Foreign Application Priority Data

Jan. 14, 2000 (JP) ...................................... 2000-007078

(51) Int. Cl.7 ...................... H01H 85/044; H01H 85/25; H01H 85/48; H02H 3/08; H02H 1/18

(52) U.S. Cl. ........................... 337/194; 337/4; 337/186; 337/208; 361/104; 361/642

(58) Field of Search ............................... 337/1, 4, 5, 9, 337/142, 186, 194, 208; 361/104, 626, 642, 646, 833, 835, 837; 307/112, 116, 125, 130, 131, 149

(56) References Cited

U.S. PATENT DOCUMENTS 1,966,716 A * 7/1934 Green ........................ 337/188
2,186,813 A * 1/1940 Adam et al. ................ 337/194
2,289,122 A * 7/1942 Jackson et al. ............. 337/139
2,636,096 A * 4/1953 Di Blasi ..................... 337/189
3,030,474 A * 4/1962 Scott, Jr. .................... 337/146
3,202,788 A * 8/1965 George ....................... 337/194
3,488,463 A 1/1970 Mellinger
4,283,100 A * 8/1981 Griffin et al. ............... 361/823
4,733,028 A * 3/1988 Flumignan ................ 200/16 B
4,851,963 A * 7/1989 Miller et al. .............. 200/16 F
5,072,081 A * 12/1991 Sepelak et al. ............. 218/151
RE34,113 E * 10/1992 Miller et al. .............. 200/16 F
5,406,449 A * 4/1995 Hicks et al.
D367,041 S * 2/1996 Alfaro et al. .............. D13/160
5,559,662 A * 9/1996 Happ et al. ................. 337/265
5,831,228 A 11/1998 Kuki et al.
5,842,560 A 12/1998 Kuki et al.
5,847,338 A 12/1998 Kuki et al.
5,906,508 A * 5/1999 Jeffcoat ...................... 200/308
5,973,418 A * 10/1999 Ciesielka et al. ........... 307/112
5,993,225 A * 11/1999 Johnson et al. ............. 439/136
6,317,312 B1 * 11/2001 Hashizawa et al. ......... 337/194
6,327,140 B1 * 12/2001 Hashizawa et al. ......... 337/194
6,333,845 B1 * 12/2001 Hashizawa et al. ......... 337/194
2001/0000596 A1 5/2001 Konda et al.

FOREIGN PATENT DOCUMENTS

DE 100 21 722 A1 1/2001
EP 411216 A1 * 2/1991 ........... H01R/27/00
EP 0 790 675 A2 8/1997
EP 1 077 456 A2 2/2001
FR 2445009 A * 8/1980 ............ H01H/1/20
JP 7-298430 A * 11/1995 ......... H02B/11/133
JP A 9-223439 8/1997
JP 11-176507 A * 7/1999 ........... H01R/13/44
JP A 11-252703 9/1999

* cited by examiner

*Primary Examiner*—Anatoly Vortman
(74) *Attorney, Agent, or Firm*—Oliff & Berridge, PLC

(57) ABSTRACT

A breaker apparatus comprises: a breaker switch including a pair of fixed electrodes standing upright on the breaker body, a plug detachably mounted on the breaker body, and a movable electrode provided on the plug for disconnecting and connecting between both fixed electrodes by being pulled out or pushed in to the both fixed electrodes; and a fuse mounted in parallel with the breaker switch, characterized in that a locking lever is pivotably mounted on one of the breaker body and the plug and the locking lever is pivoted to the locking position where the plug is locked in the fitted state, in that the breaker body is provided with a micro switch having a swinging strip for detecting whether or not the locking lever is pivoted to the locking position so that the micro switch is activated when the tip of the locking lever pivots along the length of the swinging strip and presses the swinging strip on the way to activate the micro switch, and in that the tip of the locking lever is formed so that the length is maximum at the rear edge that trails when the locking lever is pivoted toward the locking position and decreases gradually toward the leading edge.

2 Claims, 15 Drawing Sheets

BREAKER APPARATUS

BACKGROUND OF THE INVENTION

The present invention relates to a breaker apparatus to be used for switching the power cable connected to the battery or the like of the automotive vehicle between the conduction state and the out-of-conduction state.

A breaker apparatus as disclosed in the Unexamined Japanese Patent Application Publication No. Hei 9-223439 is conventionally known as a breaker apparatus of the type described above. This breaker apparatus comprises, as shown in FIG. 14, a breaker switch including a pair of fixed electrodes 5, 5 standing upright on the breaker body 1 and a movable electrode 4 formed on the plug 3 to be fitted to the breaker body for plugging in and out of both fixed electrodes 5, 5, and a fuse 2 provided in series with the breaker switch.

When the plug 3 is pulled out, both fixed electrodes are disconnected so that the fuse 2 can be replaced with the cable e being in the out-of-conduction state, and thereafter when the fuse 2 is replaced and the plug 3 is fitted to the breaker body 1, the movable electrode 4 connects between both fixed electrodes 5, 5 so as to bring the cable e into conduction.

In this stage, it is important to know whether or not the plug 3 is properly fitted, and thus in the related art, a magnet 8 is provided at the prescribed position on the handle 7 to be used for fitting in or pulling out the plug 3 so that when the handle 7 is tilted down after the plug 3 is inserted, a magnet force of the magnet 8 is detected by the sensor (not shown) provided on the breaker body 1, thereby detecting whether or not the plug 3 is correctly fitted. However, detection by a magnetic force is not sufficiently accurate since it may be affected by electrical current or the like around the sensor.

In the conventional breaker apparatus, there is an apprehension that the plug 3 is held only by a frictional force between the movable electrode 4 and the fixed electrodes 5, 5 thereby being poor in retaining force, an apparatus providing a locking mechanism for positively retaining the plug at the fitted position is on the way to development. More specifically, the lock lever is pivotably provided on the plug, and when the lock lever is pivoted into the locking position after the plug is fitted in position, the plug is locked in the retained state together with the lock lever by the locking portion formed on the breaker body.

Whether or not the lock lever is pivoted to the normal locking position is detected by the micro switch, whereby whether or not the plug is correctly fitted can be detected.

An example of the structure described above is schematically shown in FIG. 15. In other words, the lock lever r is supported so as to be able to pivot from the upright position $r_1$, with respect to the plug to the horizontal locking position $r_2$, and when the lock lever r is pivoted into the locking position $r_2$ after it is correctly fitted to the breaker body, the locking end $r_a$, is locked to the locking portion of the breaker body.

On the other hand, the breaker body is provided with a micro switch M in the pivoting area of the detecting end $r_b$ of the lock lever r. The micro switch M is known switch having a swinging strip K as an actuator, wherein the swinging strip K is mounted vertically upwardly.

When the lock lever r is pivoted to the locking position $r_2$, the detecting end $r_b$ presses the swinging strip K to turn the micro switch ON, and thereby detecting whether or not the lock lever is locked and the plug is correctly fitted, in which accuracy can be expected in comparison with the case using a magnetic force.

The micro switch M described above is turned on when the button or the like is pressed by the movement of the swinging strip K from the natural state by a prescribed angle, and it is preferable that the micro switch M is turned on simultaneously with the arrival of the lock lever r at the locking position $r_2$. However, when considering tolerances of the mounting position of the micros witch M or the locking lever r, a time lag occurs between the timing when the swinging strip K presses the detecting end $r_b$ of the locking lever r and the timing when the micro switch is turned on.

Especially, in FIG. 15, when the micro switch M and the lock lever r are positioned at a distance from each other, it is set so that the micro switch M is turned on slightly before the lock lever r reaches the locking position $r_2$ because the condition that the micro switch M is not turned on even in the state where the lock lever r is in the locked state must be avoided.

Therefore, employing a locking lever r having a same width along the whole length thereof allows a timing of pressing the micro switch M to be earlier, and thus not some little process is required until the lock lever r is locked after the micro switch M is turned on. However, there may be cases where the lock lever r is not locked completely because its pivotal movement is interrupted on the way although the micro switch M is turned on and a signal indicating that the locking is complete is obtained, whereby detection of the completion of locking cannot be performed correctly.

As a matter of course, there are some considerable countermeasures such as reducing the width of the lock lever, or changing the mounting position of the locking lever or the micro switch to shift the timing of pressing the swinging strip of the micro switch. However, the former has a limit in the strength, and the latter cannot be employed easily since major design changes are required.

With such conditions in view, an object of the present invention is to provide a system in which detection of the completion of locking can be made correctly while minimizing design changes involved.

SUMMARY OF THE INVENTION

In order to achieve the object described above, the first aspect of the present invention is a breaker apparatus comprising: a breaker body, a breaker switch including a pair of fixed electrodes standing upright on the breaker body, a plug detachably mounted on the breaker body, and a movable electrode provided on the plug for disconnecting and connecting between both fixed electrodes by being pulled out or pushed in to the both fixed electrodes; and a fuse mounted in parallel with the breaker switch, characterized in that a locking lever is pivotably mounted on one of the breaker body and the plug and the locking lever is pivoted to the locking position where the plug is locked in the fitted state, in that the breaker body is provided with a micro switch having a swinging strip for detecting whether or not the locking lever is pivoted to the locking position so that the micro switch is activated when the tip of the locking lever pivots along the length of the swinging strip and presses the swinging strip on the way to activate the micro switch, and in that the tip of the locking lever is formed so that the length is maximum at the rear edge that trails when the locking lever is pivoted toward the locking position and decreases gradually toward the leading edge.

The second aspect of the present invention is a breaker apparatus as set forth in the first aspect, characterized in that the locking lever is provided on the plug for serving also as a handle.

First Aspect of the Invention

When a plug is mounted on the breaker apparatus, both fixed electrodes are brought into conduction via the movable electrode in the plug. When the locking lever is pivoted to the locking position after the plug is correctly fitted, the plug is locked in a retained state. In association with the pivotal movement of the locking lever into a locking position, the tip of the locking lever abuts against the swinging strip and presses the same, and thus the micro switch is activated.

Since the shape of the tip of the locking lever is such that the length is maximum at the rear edge that trails when the locking lever is pivoted to the locking position and reduces gradually toward the leading edge, it presses the swinging strip when it moves closer to the locking position than the case of the conventional case to activate the micro switch.

Referring now to FIG. 11, the effect of the invention will be described while comparing with the conventional apparatus employing a locking lever having a same width along the whole length thereof.

In the same figure, the sign R designates the locking lever of the present invention, and the sign r designates the conventional locking lever, and the micro switch M is turned on when the swinging strip K is pressed by the tip of the locking lever R, r and swung by a prescribed angle from the natural state to the position G. The signs S and s designate centerlines of the width of the locking lever of the present invention and of the conventional locking lever respectively passing through the axis of the pivotal movement thereof, and locking action is completed when the centerlines S and s reach the position C (locking position). At this time, the swinging strip K reaches the position H.

When the locking levers R, r and the micro switch M is disposed at the shortest distance with respect to each other within a tolerance, for example, the conventional locking lever r activates the micro switch M when it reaches the position A. On the other hand, since the tip portion of the locking lever R of the present invention is shaped in such a manner that the trailing edge is the longest and the leading edge forms so called a clearance, the trailing edge of the tip portion presses the swinging strip K by a prescribed angle when the centerline reaches the position B to activate the micro switch.

In other words, according to the present invention, the micro switch M can be activated later than the case of the conventional case by the time period corresponding to the angle between A and B, i.e. at the timing when it is closer to the locking position C than the conventional case. In other words, the difference between the activation of the micro switch M and the arrival of the locking lever R to the locking position C may be reduced so that the completion of locking can be detected correctly.

In addition, it requires only minor design changes such as changing the shape of the tip portion of the locking lever R.

Second Aspect of the Invention

Since fitting locking of the plug can be performed in a series of actions in the state of gripping the locking lever, the workability is improved.

DETAILED DESCRIPTION OF THE PREFERRED EMBODIMENTS

Referring now to FIG. 1 to FIG. 10, an embodiment of the present invention will be described. The breaker apparatus of this embodiment is provided at some midpoint of the power cable of the electric vehicle for switching the power cable between the conduction state and the out-of-conduction state.

Figure 1:
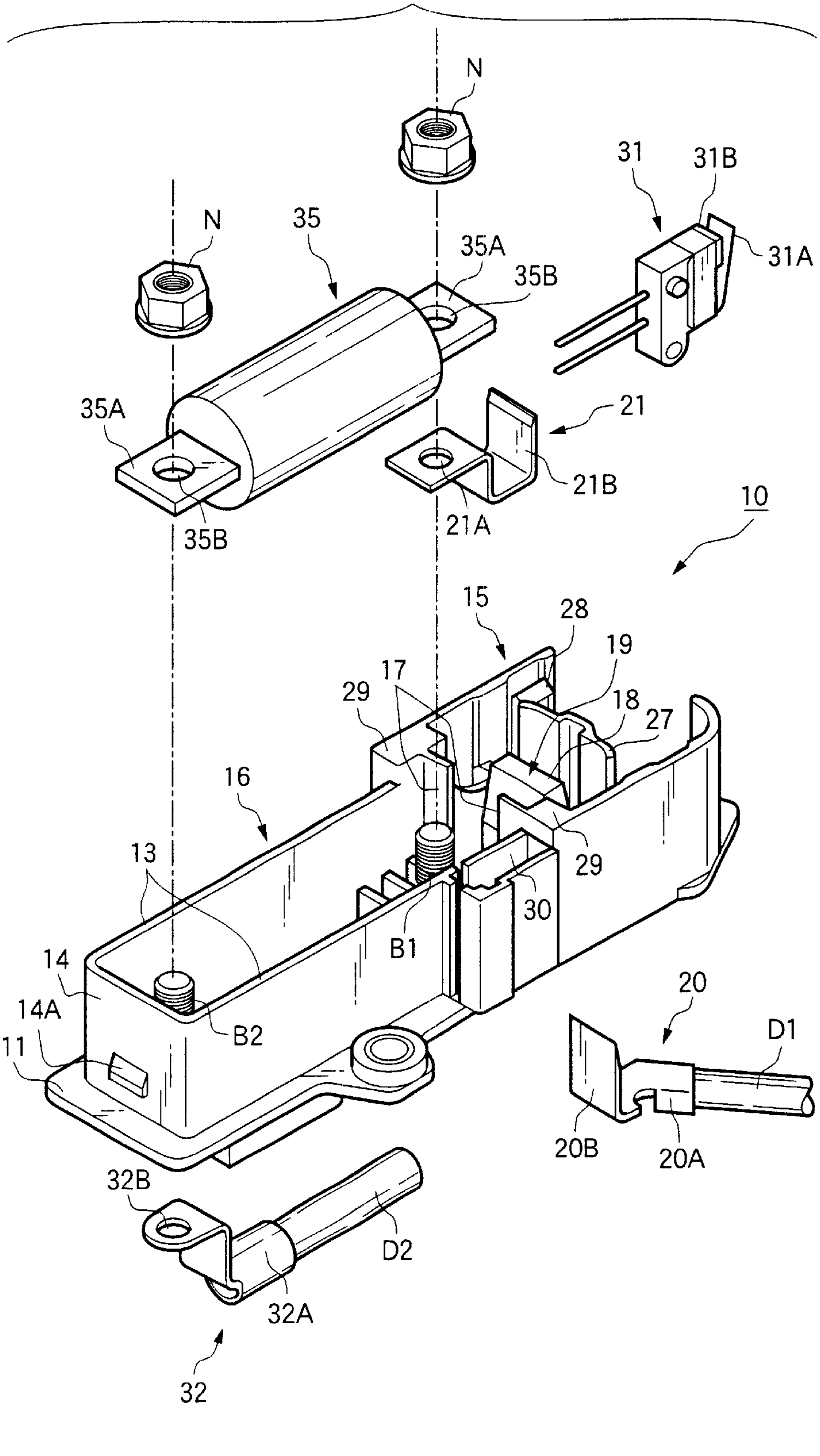
FIG. 1 is a perspective view of a breaker apparatus according to the first embodiment of the present invention.

The breaker body 10 provided in this breaker apparatus is, as shown in FIG. 1, provided with a pair of elongated walls 13, 13 along the length of the plate-shaped base 11, and the ends of these elongated walls 13, 13 are connected by a short wall 14 on one side leaving the other ends open. The opened side is enlarged in a stepped manner so that a plug storage section 15 is formed therein, and the closed side is provided with a fuse storage section 16 enclosed by both elongated walls 13, 13 and the short wall 14. The plug storage section 15 and the fuse storage section 16 are divided by the partitioning walls 17, 17 extending from both elongated walls 13, 13 toward each other.

Figure 4:
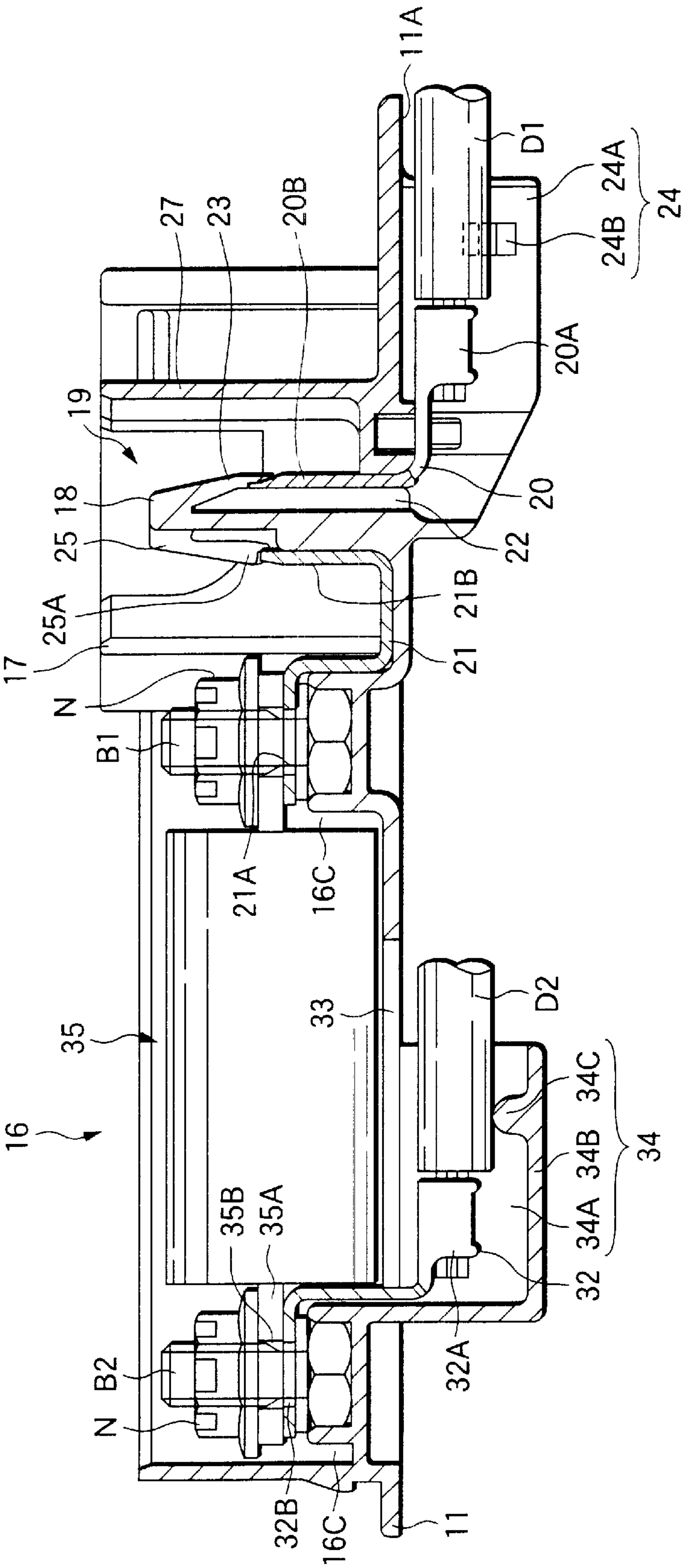
FIG. 4 is a cross sectional side view of the breaker body.

In the plug storage section 15 at the position away from the partitioning walls 17, as shown in FIG. 4, a projecting wall 18 is standing upright from the base 11, and the front and back surfaces facing in the direction along the length (toward left and right in FIG. 4) of the breaker body 10 are provided with a first and second fixed electrodes 20, 21.

Specifically, the front surface 18A of the projecting wall 18 facing toward the right in FIG. 4 is provided with a first fixed electrode 20, and the first fixed electrode 20 is formed by bending a metallic plate into L-shape so as to have a barrel portion 20A on its proximal end, to which a power cable D1 is crimped. The tip contact portion 20B of the first fixed electrode on the opposite end from the barrel portion 20A is inserted into the plug storage section 15 through a through hole 22 from the back side of the base 11 and laid on the proximal end of the front surface 18A of the projecting wall 18. On the tip side of the front surface 18A of the projecting wall 18, there is formed with a projecting portion 23 and the tip of the first fixed electrode 20 abuts against the lower surface of the projecting portion 23.

On the other hand, the back surface 18B of the projecting wall 18 facing toward the left in FIG. 4 is provided with the second fixed electrode 21, which is formed by bending a metallic plate into U-shape, and bending again one of the legs of the U-shape outwardly to form a right angle and providing a bolthole 21A on the tip thereon. The second fixed electrode 21 is pressed into between the partitioning wall 17 and the projecting wall 18 from the bottom side of the U-shape so that the tip contact portion 21B is laid on the proximal end of the back surface 18B of the projecting wall 18. Through the bolthole 21A, a bolt B1 provided on the fuse storage section 16 described later is passed.

Figure 6:
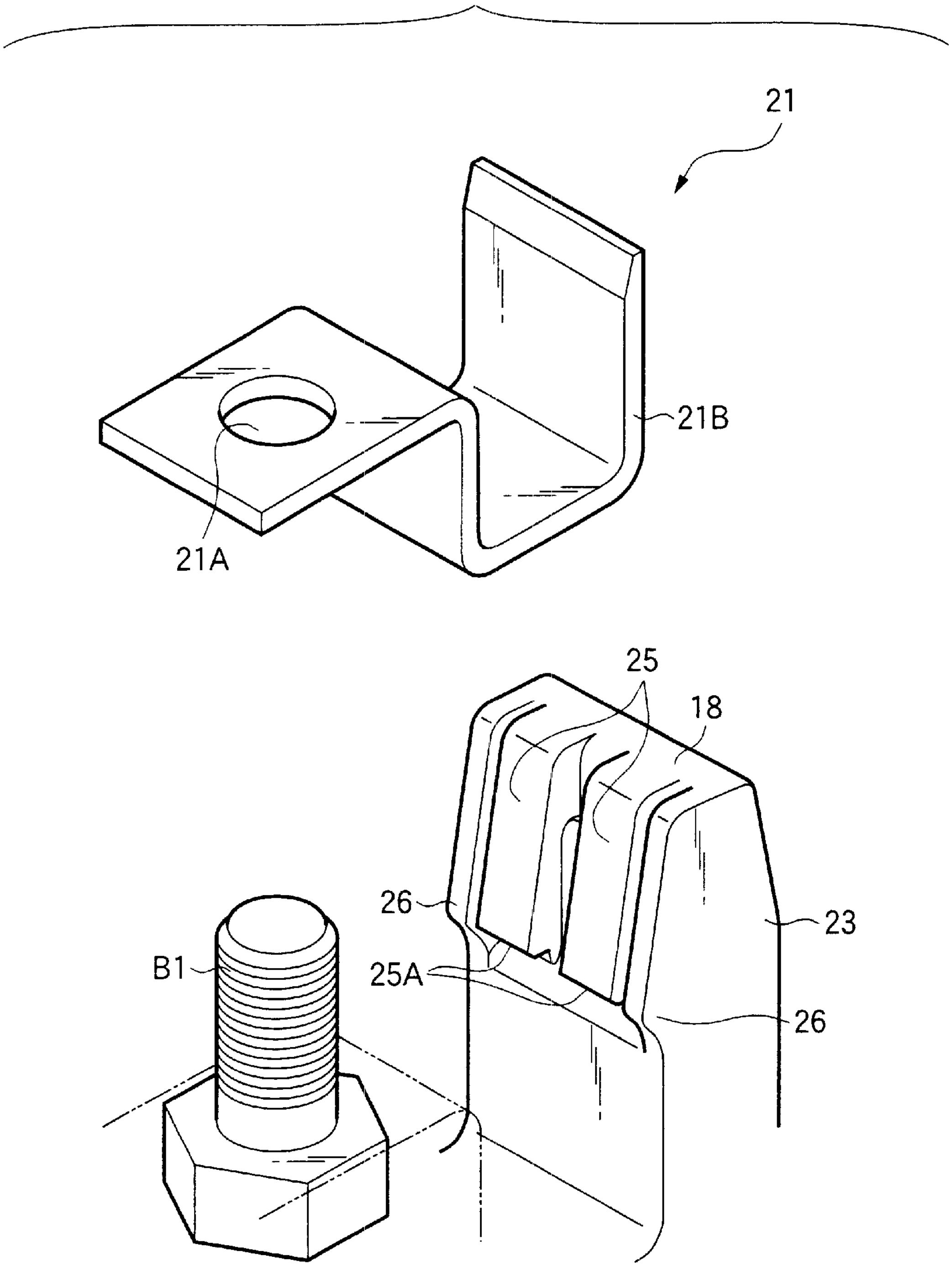
FIG. 6 is a perspective view showing the projecting wall and fixed electrodes.

On the tip of the back surface 18B of the projecting wall 18, as shown in FIG. 6, a pair of rances 25, 25 for preventing the second fixed electrode 21 from being disengaged. These rances 25, 25 extend from the tip of the projecting wall 18 horizontally and then downwardly in parallel with the projecting wall 18, and the tip of second fixed electrode 21 abuts against the lower surface of the engaging portion 25A formed at the lower end portion (See FIG. 4). On the back surface 18B of the projecting surface on both sides of the rances 25, as shown in FIG. 6, a rance protecting walls 26, 26 standing upwardly beyond the rances 25 are provided.

In the plug storage section 15 at the position away from the projecting wall 18 farther than the partitioning walls 17, there is formed an end wall 27 standing upright from the base 11, as shown in FIG. 1, and the plug 50 described later is guided by the end wall 27 and fitted to the tip of the projecting wall 18.

Figure 5:
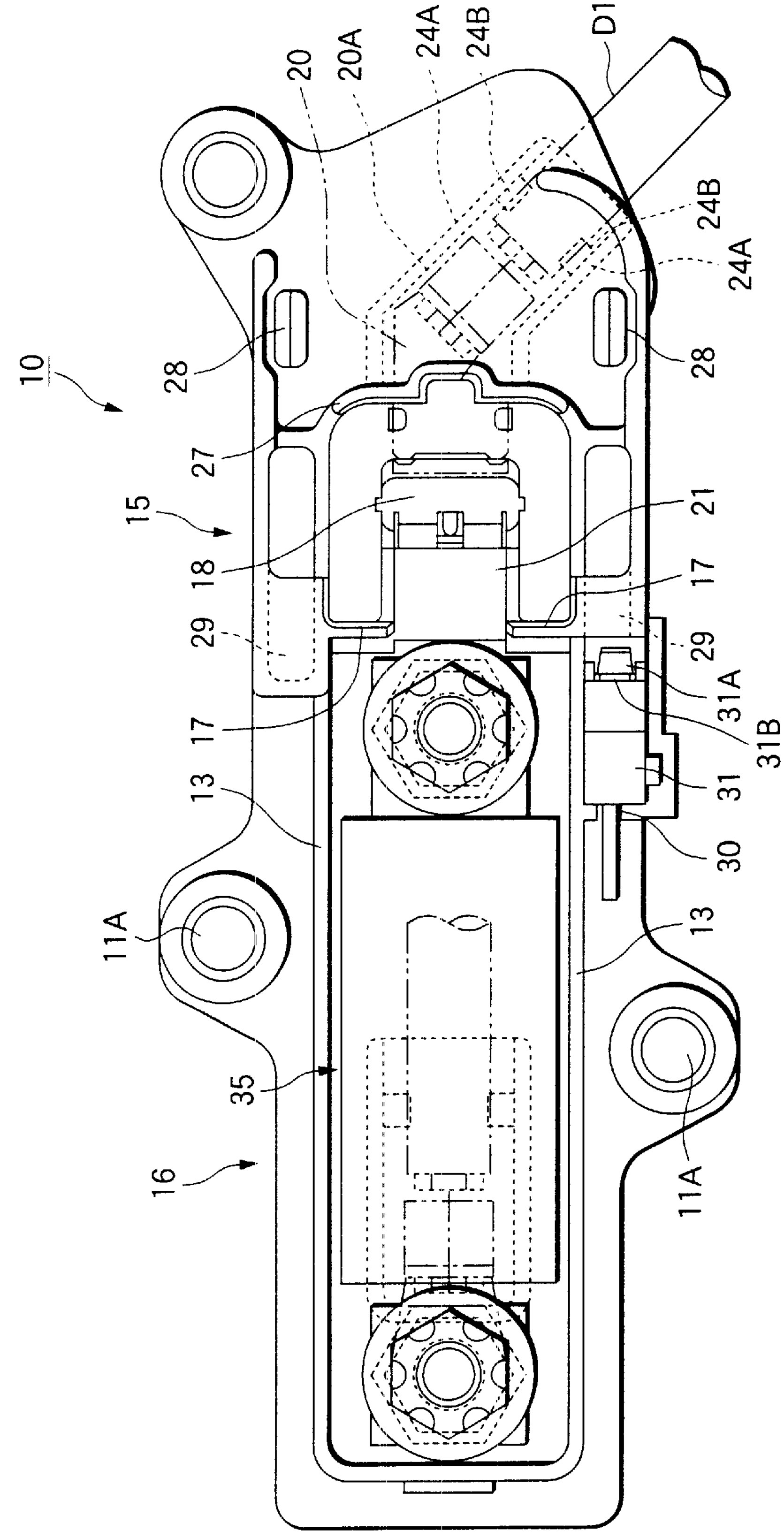
FIG. 5 is a plan view of the breaker body.

The back side of the base 11 corresponding to the plug storage section 15 (the surface facing downward in FIG. 4) is provided with a cable holding portion 24 for holding the cable D1 extending from the first fixed electrode 20. The cable holding portion 24 receives, as shown in FIG. 5, a cable D1 between a pair of opposed walls 24A, 24A suspended from the back surface of the base 11 facing with respect to each other, and limits the downward movement of the cable D1 by means of a pair of cable engaging projections 24B, 24B projecting from the opposed walls 24A, 24A toward each other. The cable engaging projection 24B is formed with a guiding surface inclining downwardly for providing ease of the cable D1 passage as far as it will go.

The fuse storage section 16 will now be described. As shown in FIG. 4, the fuse storage section 16 is provided on both shorter ends with a pair of seat portions 16C, 16C protruding from the base 11, in which metallic bolts B1, B2 are insert molded with their heads embedded and the threaded portion extended upward. The second fixed electrode 21 is inserted into the bolt B1 located near the plug storage section 15, and the terminal strip 32 is inserted into the other bolt B2.

The terminal strip 32 is formed by bending a metallic plate into a crank shape and provided with a cable D2 on the barrel portion 32A formed on one end thereof. Then, the bolt B2 is inserted into the bolthole 32B formed on the tip of the terminal strip 32 with the cable D2 inserted into the fuse storage section 16 through the service hole 33 (See FIG. 4) from the back side of the base 11. The cable D2 is pulled outwardly from the service hole 33 and held by the cable holding portion 34 provided on the back side of the base 11.

As shown in FIG. 4, the cable holding portion 34 comprises a pair of opposing walls 34A, 34A suspended from both edge of the service hole 33 on the back surface of the base 11 and connected between the lower edges thereof by a bottom wall 34B, so that most part of the service hole 33 is covered. The cable D2 is prevented from being drooped downwardly by an elongated projection 34C projecting upward from the bottom wall 34B.

The fuse 35 stored in the fuse storage section 16 comprises, as shown in FIG. 1, a metallic projections 35A, 35A projecting from both ends of the cylindrical body and having respectively round holes 35B passing therethrough, through which both bolts B1, B2 of the fuse storage section 16 are inserted and tightened with nuts N, N thereon.

Figure 2:
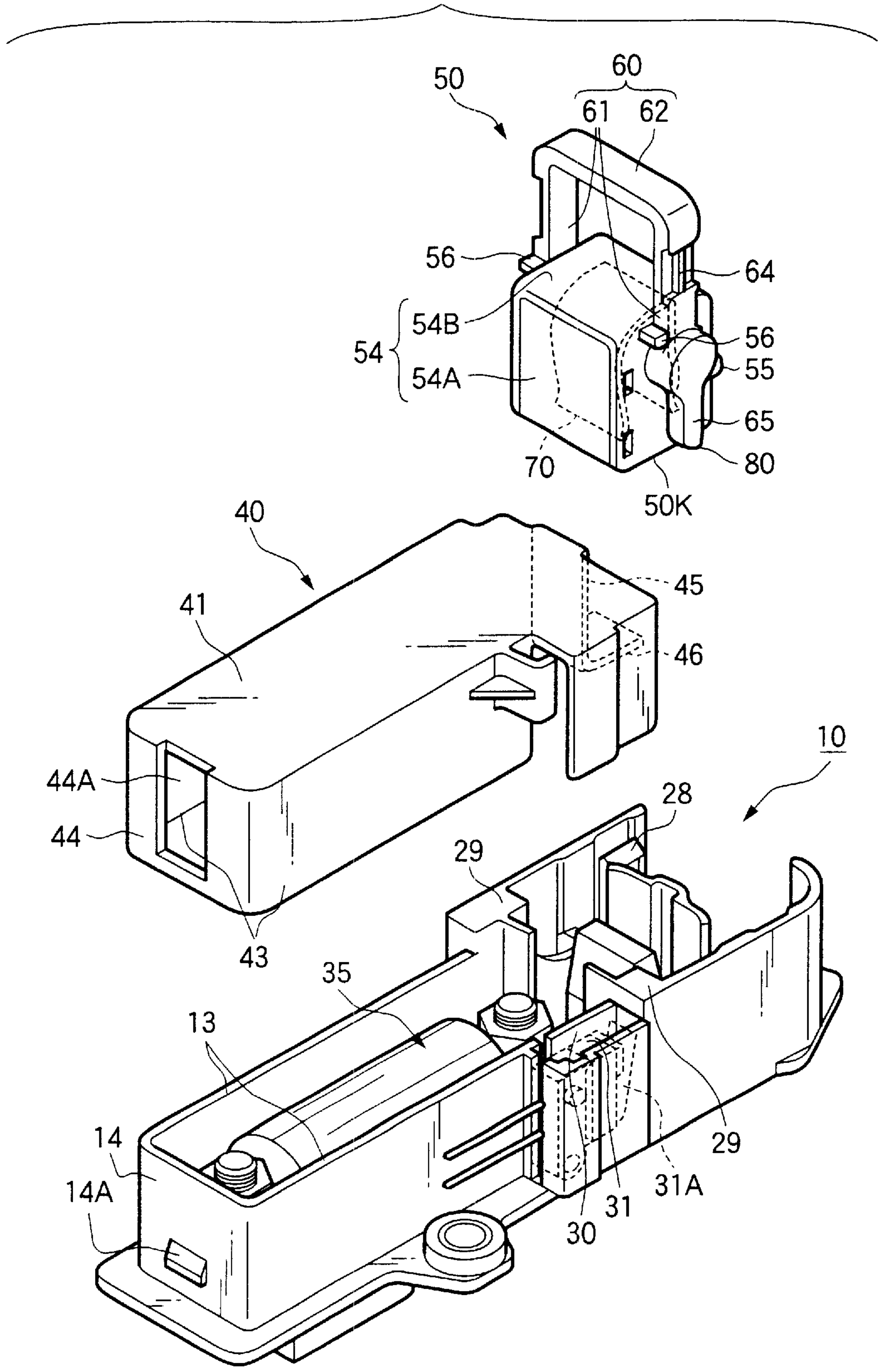
FIG. 2 is a perspective view of the breaker apparatus showing a state in which the cover and the plug are removed.

The fuse storage section 16 is fitted with a cover 40 shown in FIG. 2. The cover 40 comprises an elongated top wall 41 formed corresponding to the fuse storage section 16, a pair of elongated walls 43, 43 extending in parallel along the length thereof, and a short wall 44 connecting the ends of these elongated walls 43, 43 with the other ends left open. On the opened end, the rectangular vertical wall 45 is suspended from the top wall 41 and is formed with a limiting projection 46 overhanging outwardly longitudinally of the cover 40 from the tip thereof.

The plug 50 will be described. The plug 50 comprises, as shown in FIG. 2, a prism shaped housing 54 having a bottom on one end and an opening recess 51 (See FIG. 7) on the bottom side. The recess 51 is enlarged inside in comparison with the opening so that the movable electrode 70 can be accommodated.

Figure 7:
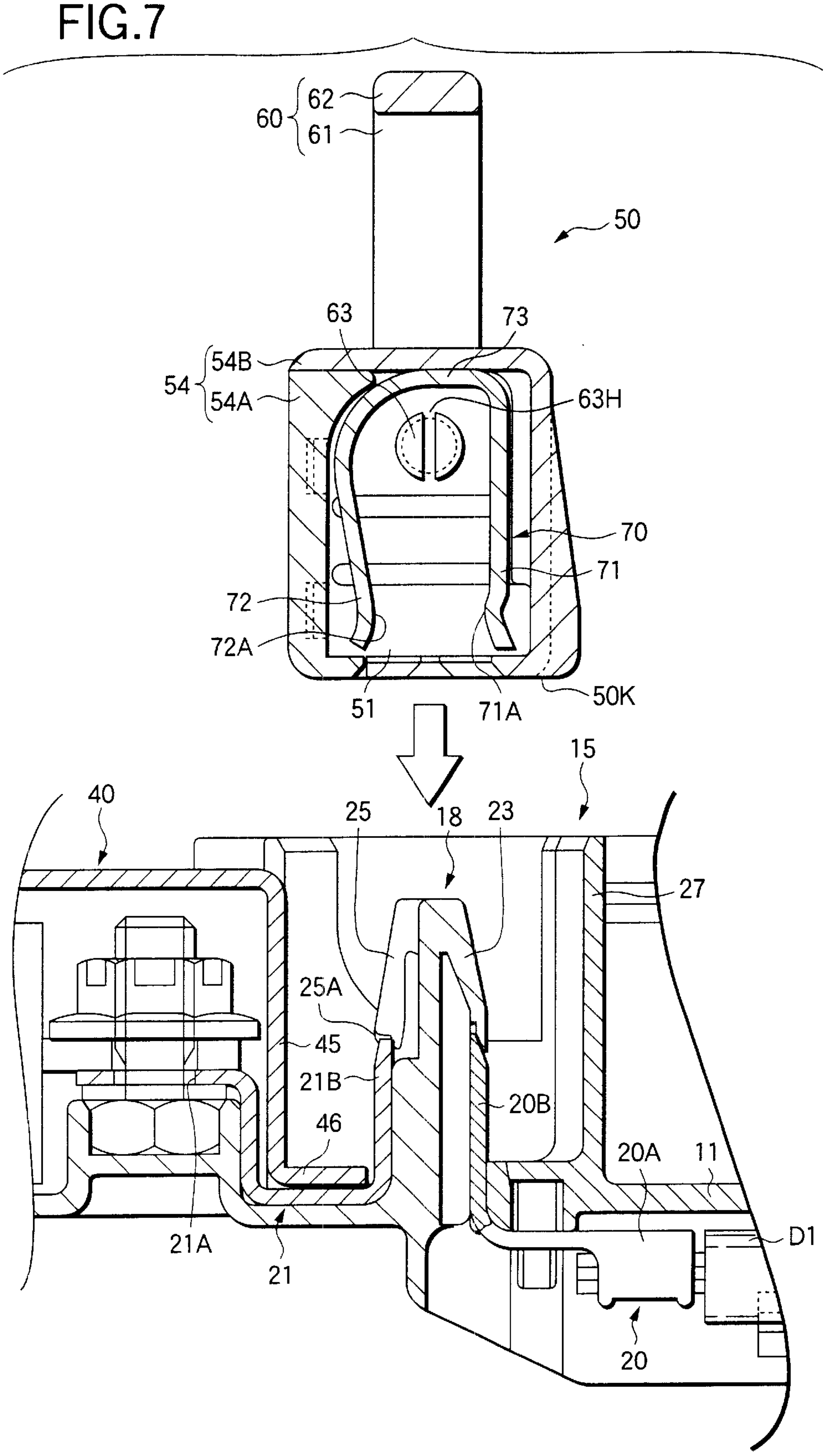
FIG. 7 is a cross sectional side view showing a state prior to fitting the plug on the projecting wall.

The movable electrode 70 is, as shown in FIG. 7, formed of a first and a second clamping strips 71, 72 to be brought into contact with the respective fixed electrodes 20, 21 connected by the connecting portion 73. More specifically, the first clamping strip 71 is linearly extending along the inner surface of the recess 51 of the housing 54, and the connecting portion 73 extends at a right angle from the proximal end (upper end in FIG. 7) of the first clamping strip 71, then gently curved as it neared the second clamping strip 72, and then continued to the second clamping strip 72. On the tips of both clamping strips 71, 82, there are provided contact points 71A, 72A projecting therefrom toward each other.

The housing 54 is, as shown in FIG. 7, provided with a wall portion 54A constituting a part of surrounding wall separately from the remaining main portion 54B, and when the wall portion 54A is not mounted on the main portion 54B, the movable electrode 70 is stored into the recess 51 from the opening and then the opening is closed by the wall portion 54A later. The movable electrode 70 stored in the recessed portion 51 abuts its lower end against the opening edge of the recess 51 so as not to be disengaged in the natural state.

On the outer surface of the housing 54 of the plug 50, a gate shaped locking lever 60 is pivotably mounted. The locking lever 60 is, as shown in FIG. 2, formed of a pair of arms 61, 61 connected on each end by the operating portion 62, and each arm 61, 61 is provided with a pivot 63, 63 (See FIG. 7) projecting toward the housing 54. The pivots 63, 63 are inserted into the axis hole 63H (See FIG. 7) formed on both side surfaces of the housing 54, so that the locking lever 60 is pivotable.

On both side surfaces of the housing 54, there are provided a rotational movement limiting projections 55, 56 for limiting the pivotable range of the locking lever 60, whereby the locking lever 60 is pivotable in the range of 90 degrees between the upright position and the horizontal position.

The locking lever 60 in the horizontal position locks the plug 50 together with the locking position 60 by engaging with the breaker body 10so as not to be disengaged. The position of the locking lever 60 in this state is called as “a locking position”. In this locking position, the locking lever 60 engages with the engaging portions 64 provided on both arms 61, 61 respectively.

The engaging portion 64 comprises a recess on the outer surface at approximately the center between the operating portion 62 of the arm 61 and the pivot 63, and a elongated projection 64A extending in the center of the recess along the length. Corresponding to each engaging portion 64, 64, in the plug storage section 15 at the position away from the partitioning walls 17 farther than the end wall 27, the engaging strips 28, 28 are standing adjacent to both elongated walls 13, 13. In the engaging portion 64, the elongated projection 64A is engageable with the engaging projection 28A provided on the upper end of the engaging strip 28

The locking lever 60 is formed on each arm 61, 61 with an inserting portion 65 extending the rotating end opposite from the operating portion. When the locking lever 60 is rotated to the locking position, each inserting portion 65, 65 enters into the receiving section 29, 29 formed at the stepped portion of the elongated walls 13, 13 at the boundary between the plug storage section 15 and the fuse storage section 16. These receiving sections 29, 29 are opened toward the direction along the length of the breaker body 10 and closed on the top portions thereof.

One of these receiving sections 29, 29 (the nearer to the viewer in FIG. 1) is in communication with the micro switch fitting chamber 30.

The micro switch 31 is provided for controlling the electricity supplied to the breaker, and comprises a switching circuit (not shown) therein and a swinging strip 31A on the back side thereof for opening and closing the switching circuit by pressing the button 31B. The swinging strip 31A is in the shape of a rectangular tongue extending vertically, the lower end of which is attached to the micro switch 31 in a swinging manner. The micro switch 31 fitted and fixed in the fitting chamber 30 is held with the upper end of the swinging strip 31A inclined toward the plug storage section 15, and in this state, the switch is "OFF" in which the switching circuit is opened. When the swinging strip 31A is pressed by the activating portion 80 provided at the tip of the locking lever 60 and thus the button 31B is pressed as described later, the micro switch 31 is turned "ON" in which the switching circuit is closed to activate and a signal indicating that locking is complete is supplied.

This embodiment is constructed in such a manner that the button 31B starts to be pressed almost simultaneously with the timing when the swinging strip 31A is pressed.

Figure 10:
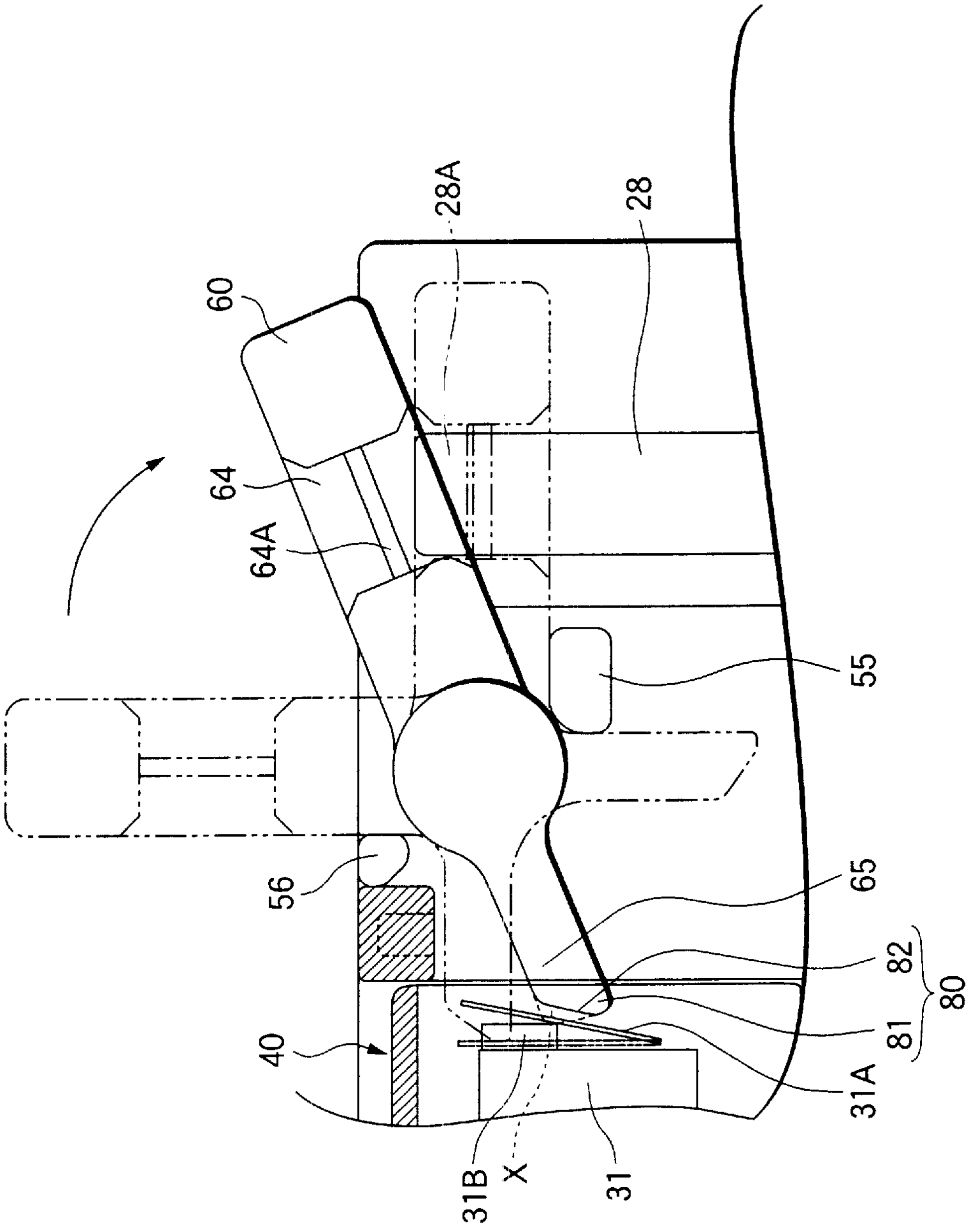
FIG. 10 is an enlarged view showing a process in which the activating portion abuts against the detecting strip.

The activating portion 80 is formed on the tip of the inserting portion 65 shown in FIG. 2 so as to extend the arm 61 of the locking lever 60 longitudinally. The activating portion 80 is, as shown in FIG. 10, the longest at the rear edge that trails when the locking lever 60 is pivoted toward the locking position and becoming shorter toward the leading edge. The longest portion serves as an abutting portion 81 and the shorter portion serves as a clearance surface 82.

The abutting portion 81 has an round and smooth upper surface so as to press the swinging strip 31A to switch the micro switch 31 between ON and OFF.

On the other hand, the clearance surface 82 is formed by cutting from the abutting portion 81 toward the leading edge, more specifically, it is formed in a bevel inclining from the front end of the abutting portion 81 to the front end of the operating portion so as to approach the pivot 63 gradually. Therefore, when the abutting portion 81 abuts the swinging strip 31A, the clearance surface 82 avoids contact with the swinging strip 31A.

The breaker apparatus of this embodiment has a structure as described above. The operation thereof will now be described. The breaker apparatus is mounted to the electric vehicle in a following manner. As a first step, a part of the power cables of the electric vehicle denoted as D1 and D2 above are attached, then the bolt is passed through the mounting hole 11A (See FIG. 5) formed on the base portion 11, and the breaker body 10 is fixed on a prescribed position of the electric vehicle.

Then, the cover 40 is fitted to the fuse storage section 16 of the breaker body 10. When the elongated wall 43 and the short wall 44 are pressed so as to fit around the elongated wall 13 and the short wall 14 of the breaker body 10, and when it is pressed deeper, the engaging hole 44A formed on the short wall 44 of the cover 40 and the engaging projection 14A formed on the short wall 14 of the breaker body 10 are engaged with respect to each other (See FIG. 3). At this time, the vertical wall 45 formed on the cover 40 is inserted between a pair of partitioning walls 17, 17 formed on one end of the fuse storage section 16, and the limiting projection 46 is laid in the vicinity of the proximal portion of the projecting wall 18 of the base 11 of the breaker body 10 (See FIG. 7).

Figure 3:
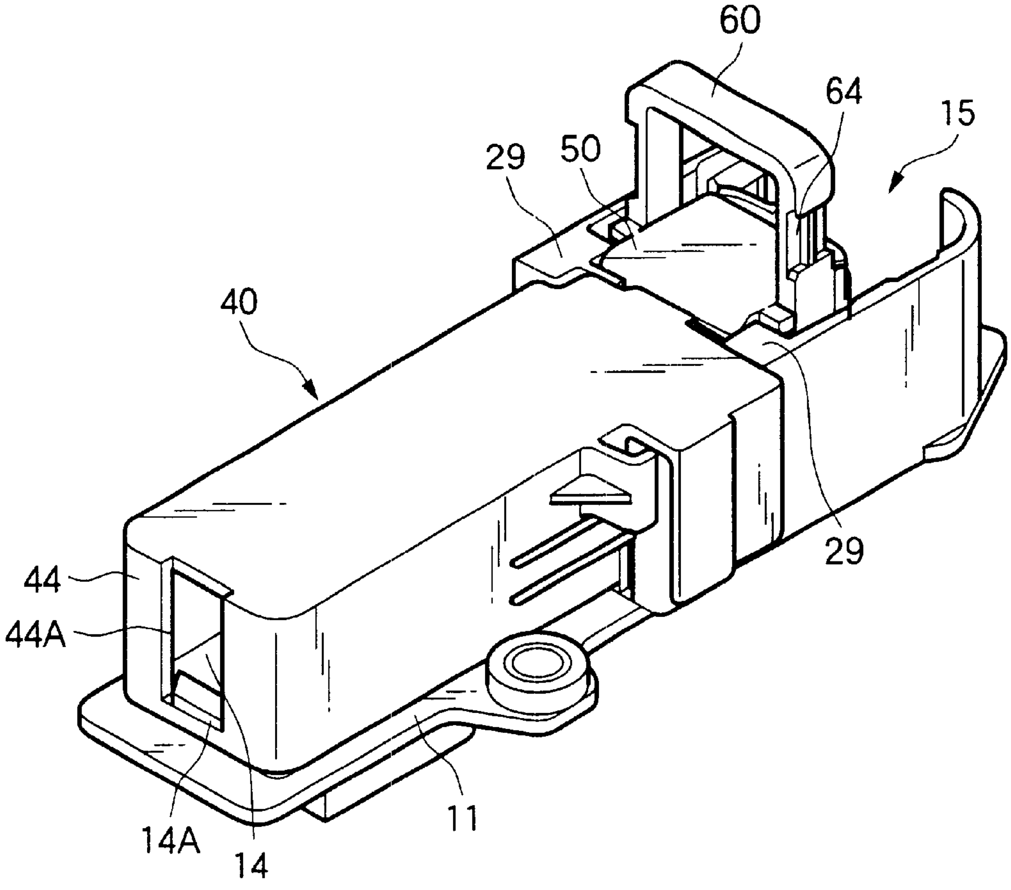
FIG. 3 is a perspective view showing a state in which the plug is inserted into the plug storage section.

In this state, the locking bar 60 is gripped and the plug 50 is inserted deep in the plug storage section 15 provided on the breaker body 10 as shown in FIG. 3. In this case, only a single plug 50 is required to be mounted, mounting operation can be carried out very easy.

Figure 8:
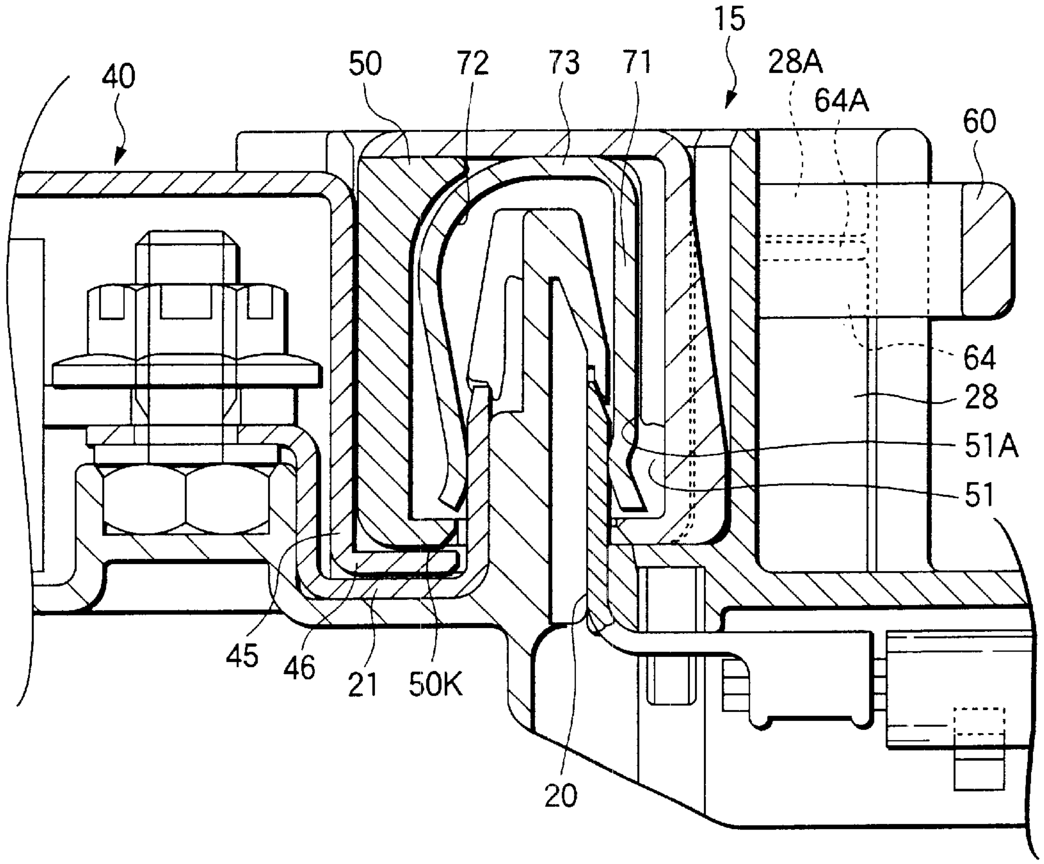
FIG. 8 is a cross sectional side view showing a state in which the plug is fitted on the projecting wall.

When the plug 50 is mounted, the limiting projection 46 provided on the cover 40 is engaged with the lower surface 50K of the plug 50 (See FIG. 8). Therefore, the cover 40 is engaged at both ends in locked state by this engagement with the plug 50 (engagement between the lower surface 50K and the limiting projection 46) and the engagement described above with the breaker body 10 and (engagement between the engaging projection 14A and the engaging hole 44A), whereby the cover 40 is prevented from being disengaged due to inclination thereof.

Figure 9:
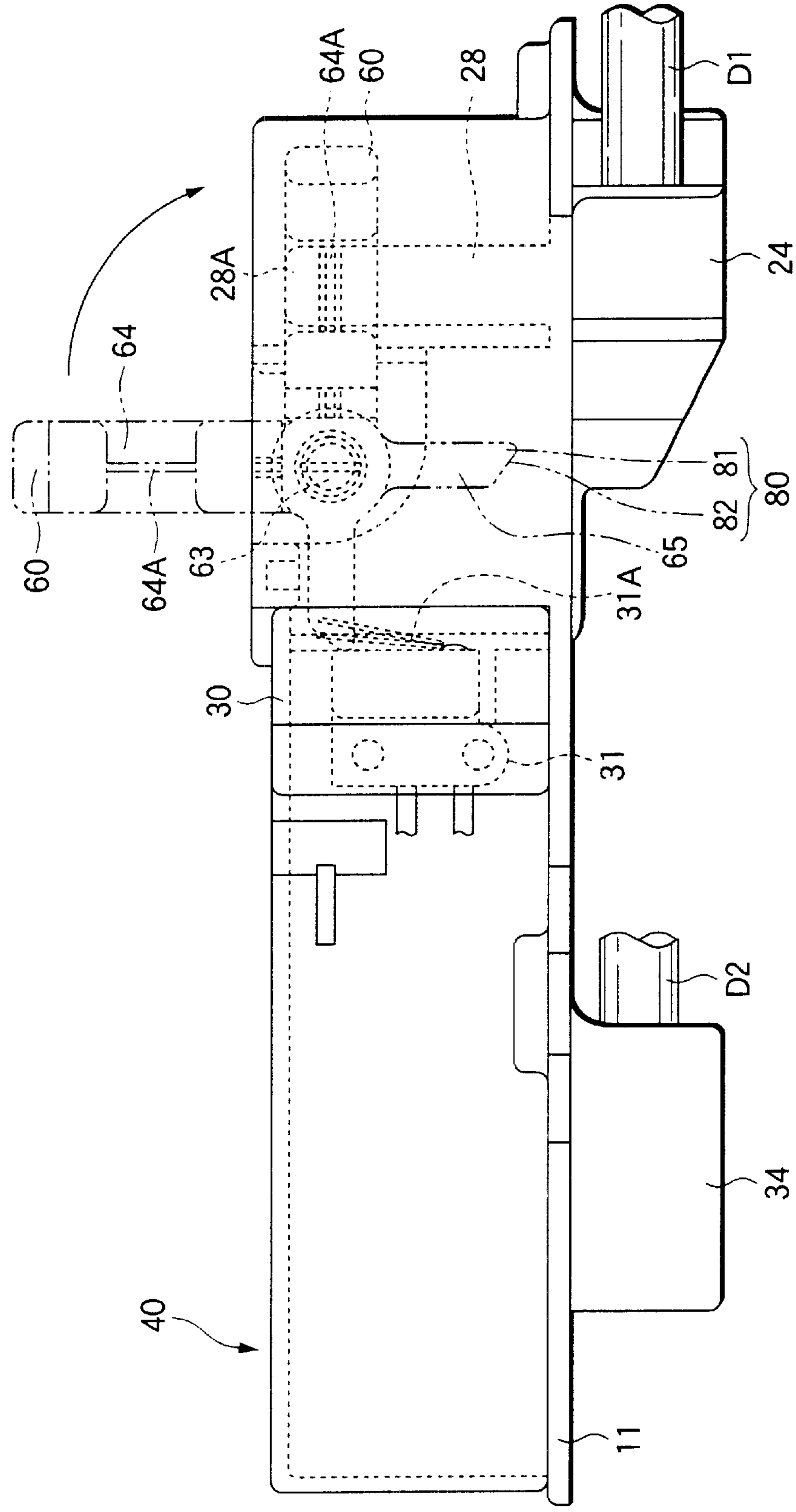
FIG. 9 is a cross sectional view of the breaker apparatus.

When the plug 50 has inserted deeply inside, the locking lever 60 is pivoted from the upright position to the horizontal position, as shown in FIG. 9. Then, in association with this pivotal movement, both inserting portions 65, 65, of the locking lever 60 are inserted into the corresponding receiving section 29, 29. Simultaneously, the activating portion 80 provided on one of the inserting portions 65 is inserted into the fitting chamber 30.

At this time, the activating portion 80 moves from the proximal end of the swinging strip 31A of the micro switch 31 as the locking lever pivots.

Figure 11:
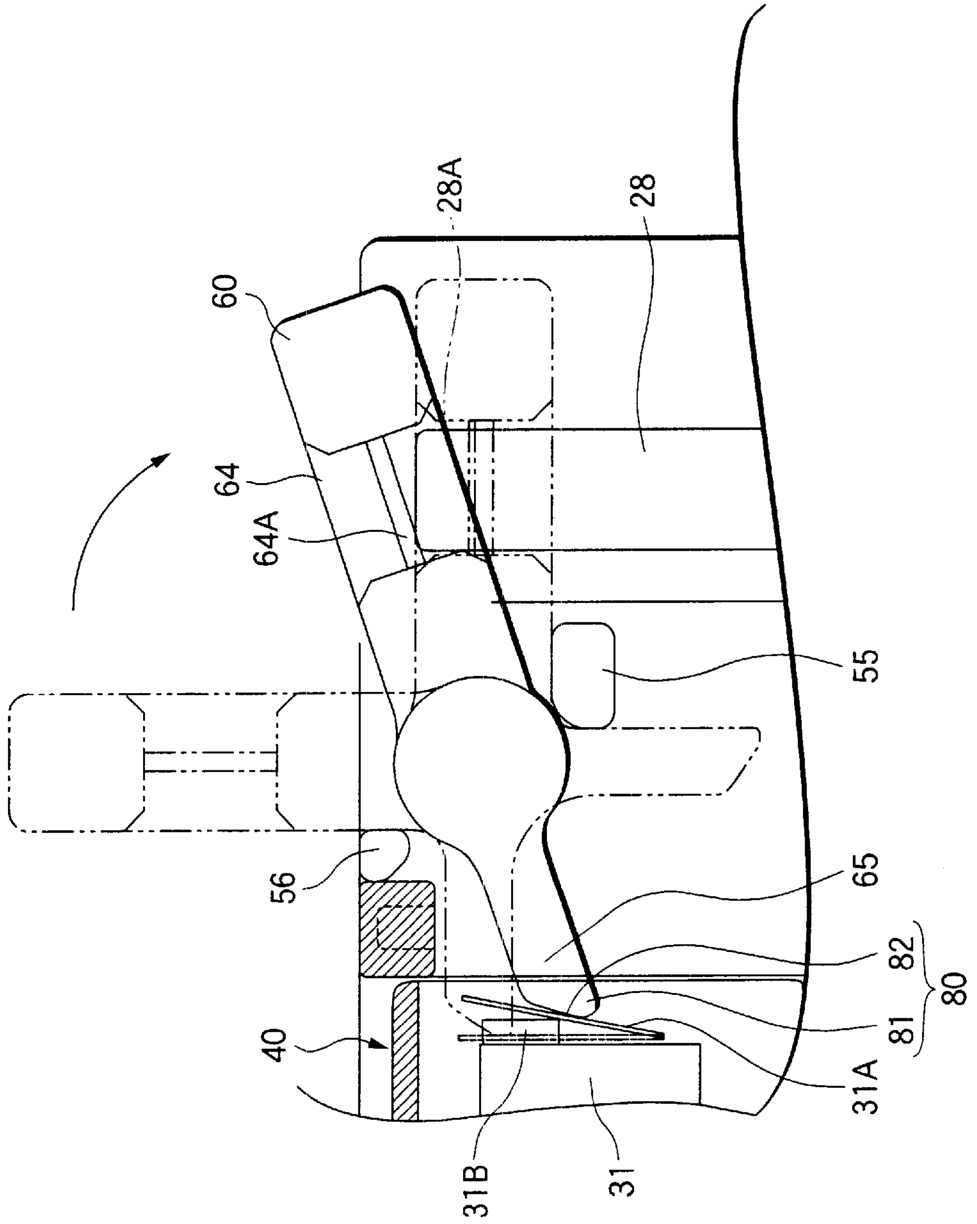
FIG. 11 is an enlarged view showing a state in which the activating portion plug is abutted against the detecting strip.

As shown in a dotted line in FIG. 10, since a clearance surface 82 is formed on the activating portion 80, the activating portion 80 of this embodiment does not abut the swinging strip 31A even when it reaches the position at which the operating portion of the conventional starts to press the swinging strip 31A at the point X and thus to press the button When the locking lever 60 is further pivoted and approaches the locking position, the activating portion 80 for the first time press the swinging strip 31A by the abutting portion 81 at the trailing edge and starts to press the button 31B (See FIG. 11). Even in this state, the activating portion 80 abuts against the swinging strip 31A only at the abutting portion 81 without allowing the clearance surface 82 on the side of the leading edge to come into contact with the swinging strip 31A. Therefore, the locking lever 60 turns the micro switch 31 on slightly before it reaches the locking position.

Then immediately after the micro switch 31 is turned on, the locking lever 60 reaches the locking position and the engaging portion 64 and the engaging strip 28 are engaged with respect to each other, so that the plug 50 is retained in the plug storing section 15 so as not to be disengaged.

When the plug is mounted in this way, in the plug 50, the projecting wall 18 is interposed between the first clamping strip 71 and the second clamping strip 72 of the movable electrode 70, and each clamping strip 71, 72 is brought into contact with each fixed electrode 20, 21 laid on the projecting wall 18, whereby both fixed electrodes 20, 21 are brought in conduction so that the fuse 35 is fed with a current, as shown in FIG. 8. Simultaneously, the micro switch 31 which is turned on by the swinging strip 31A being pressed transmits a signal indicating that the plug is mounted to a prescribed electrical circuit. Then a current flows across the fuse 35 via the cables D1 and D2 that is connected in conduction.

When replacing the fuse 35, the following steps are taken. As a first step, the plug 50 is pulled out from the plug storage section. Then the cover 40 is removed from the breaker body 10. Since the upper surface of the fuse storage section 16 is opened, the nut N fixing the fuse 35 is removed and replaced with a new fuse 35. When the operator tried to remove the cover 40 with the plug 50 mounted, the limiting projection 46 prevents the removal of the cover 40. In other words, unless the plug 50 is completely removed and the fuse 35 is completely brought out of conduction, the cover cannot be removed from the breaker body 10, so that replacement of the fuse can be curried out safely.

After the fuse 35 is replaced, by mounting the cover 40 and the plug 50, and operating the locking lever 60 as in the procedure described above, the breaker apparatus is fed with a current.

As is described thus far, the breaker apparatus according to this embodiment, since the operating portion comprises an abutting portion 81 on its edge that trails when the locking lever is pivoted toward the locking position, and a clearance surface 82 toward the leading edge, the activating portion 80 presses the swinging strip 31A at the position closer to the locking position than the case of the conventional apparatus and turns the micro switch 31 on. Therefore, the time lag between the moment when the micro switch 31 is turned on and the moment when the lock lever 60 reaches the locking position may be reduced and thus the completion of locking can be detected more precisely.

In addition, it requires only minor design changes such as changing the configuration of the activating portion 80.

According to the present invention, the operator may carry out a series of steps from fitting of the plug 50 to locking of the same with the lock lever 60 kept gripped and without changing the grip. When replacing the fuse, releasing of the lock and disengagement of the plug 50 can be made with the lock lever 60 kept gripped, thereby improving workability.

Other Embodiment

The present invention is not limited to the embodiment described above, and for example, following embodiments are also included within the technical field of the invention. In addition, various modifications other than the following embodiments may be made without departing from the scope of the invention.

Figure 12:
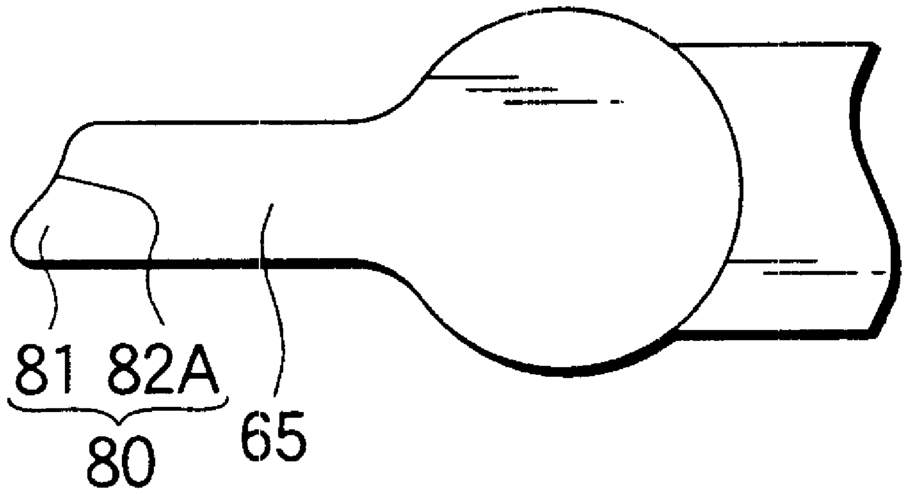
FIG. 12 is an enlarged view showing a part of an activating section according to another embodiment.
Figure 13:
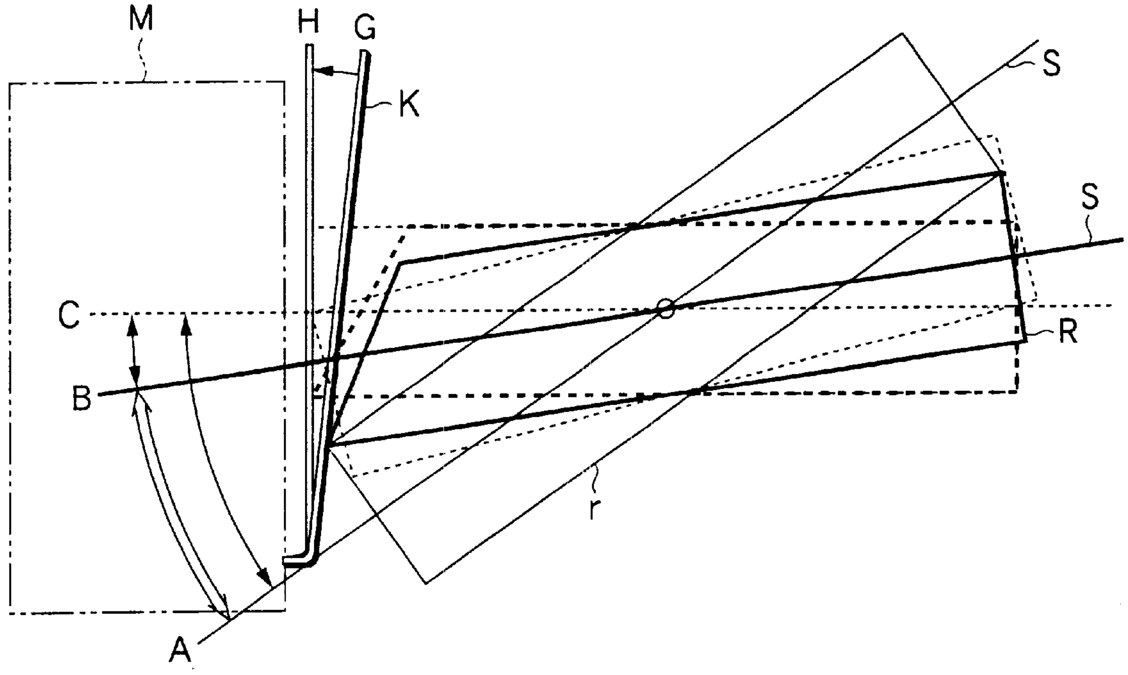
FIG. 13 is a schematic comparative drawing of the present invention and the conventional apparatus.
Figure 14:
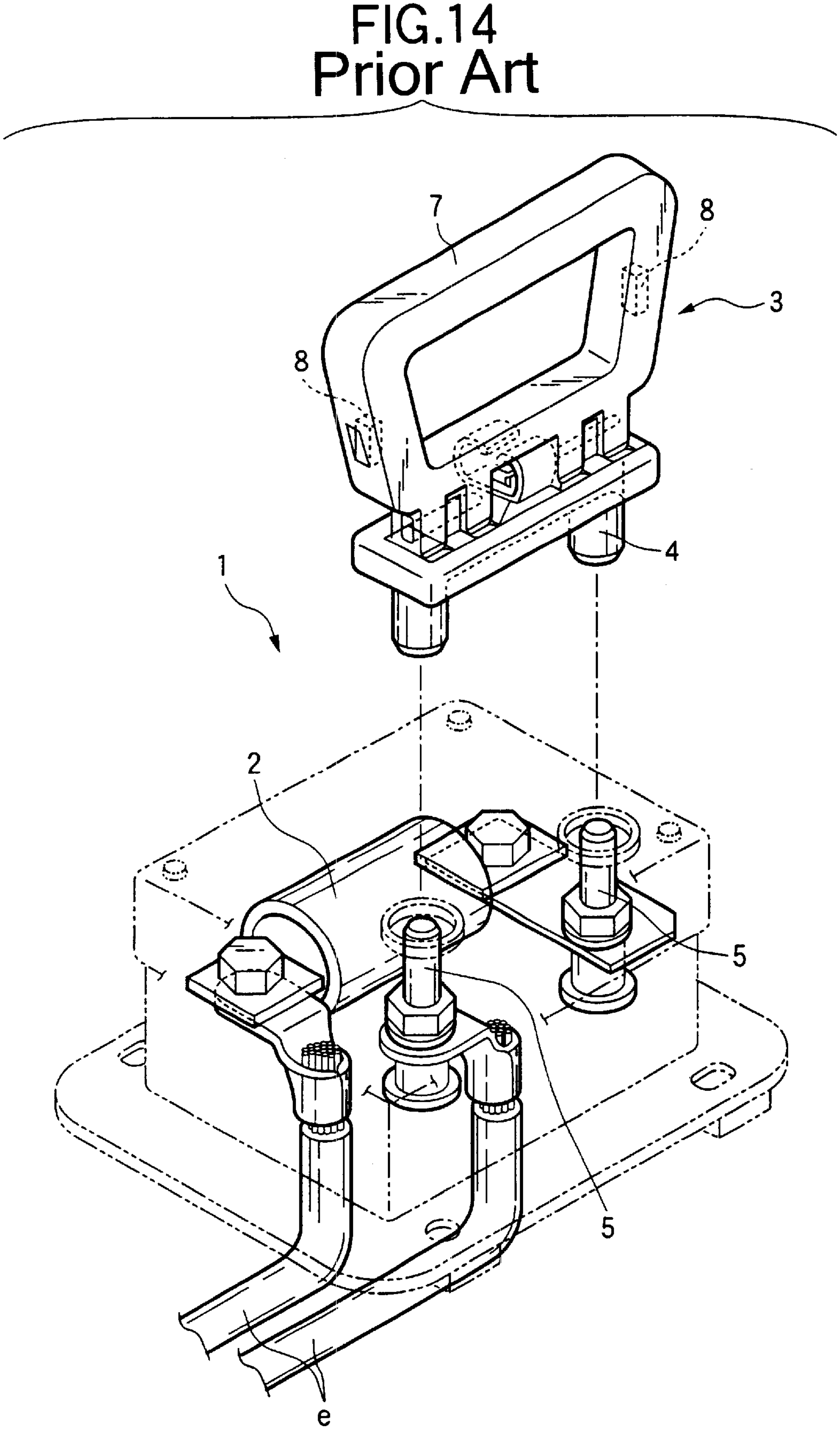
FIG.14 Prior Art
FIG. 14 is a perspective view of a conventional breaker.
Figure 15:
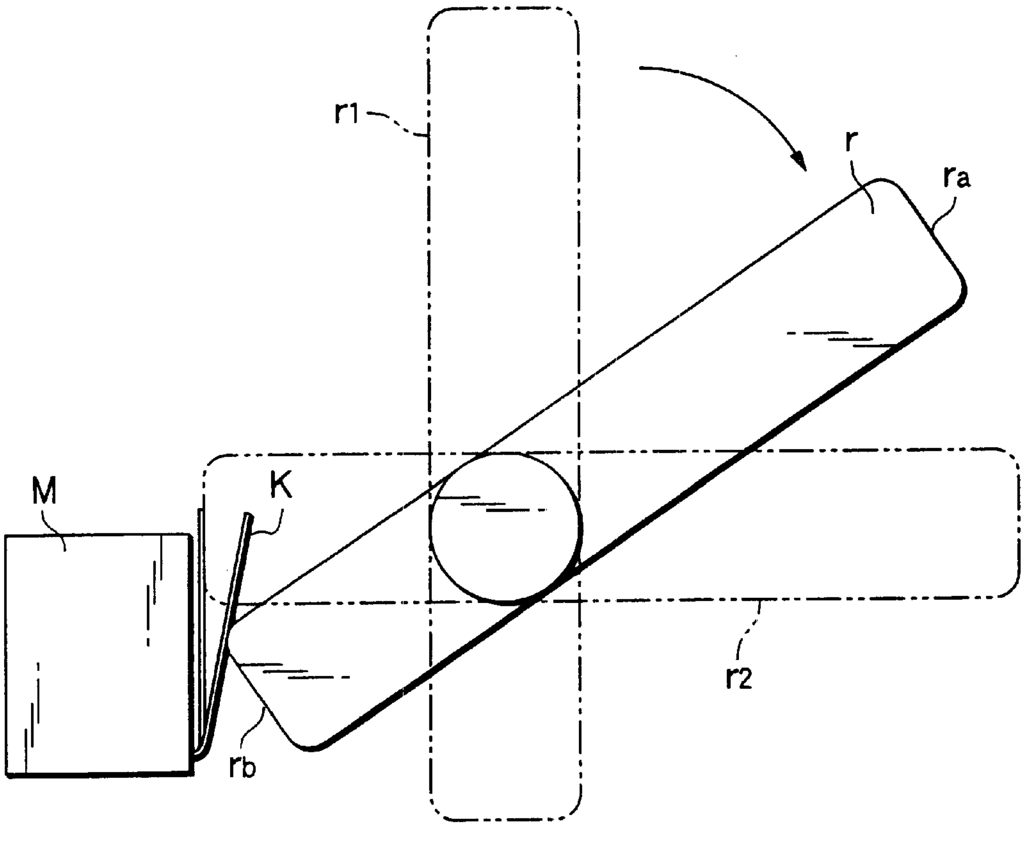
FIG.15 Prior Art
FIG. 15 is a schematic drawing showing a process in which the bar shaped locking lever abuts against the detecting strip.

(1) Though the clearance surface 82 in the embodiments described above is formed in a bevel, the clearance surface 82A may be in the form of a curved surface as shown in FIG. 12.

(2) In the embodiment described above, though the activating portion 80 is formed by extending the rotating end of the arm 61 of the locking lever 60 opposite from the operating portion 62, the operating portion may be formed in a cranked shape by bending the rotating end of the arm 61 opposite from the operating portion 62 rearward.

(3) In the embodiment described above, though the activating portion 80 is formed on the tip of the inserting portion 65, there may be provided an activating portion on the operating portion 62 of the locking lever and a micro switch is disposed correspondingly.

(4) In the embodiment described above, though the locking lever 60 is provided on the plug 50, it is also possible to provide a locking lever on the breaker body 10 and engages with the plug at the locking position.

What is claimed is:

1. A breaker apparatus comprising:

a breaker body, a breaker switch including a pair of fixed electrodes standing upright on said breaker body, a plug detachably mounted on said breaker body, and a movable electrode provided on said plug for disconnecting and connecting between said both fixed electrodes by being pulled out or pushed in to said both fixed electrodes; and a fuse mounted in parallel with said breaker switch, wherein a locking lever is pivotably mounted on one of said breaker body and said plug, said locking lever pivoted to the locking position where said plug is locked in the fitted state, said breaker body is provided with a micro switch having a swinging strip for detecting whether or not said locking lever is pivoted to said locking position so that said micro switch is activated, when the tip of said locking lever pivots along the length of said swinging strip and presses said swinging strip on the way to activate said micro switch, and the tip of said locking lever is formed so that the length is maximum at the rear edge that trails when said locking lever is pivoted toward the locking position and decreases gradually toward the leading edge.

2. The breaker apparatus as set forth in claim 1, wherein said locking lever is provided on said plug for serving also as a handle.

* * * * *